United States Patent
Kaneshiro et al.

(10) Patent No.: US 11,059,837 B2
(45) Date of Patent: Jul. 13, 2021

(54) CATALYST FOR POLYESTER POLYMERIZATION AND METHOD FOR PRODUCING POLYESTER RESIN

(71) Applicant: NITTO KASEI CO., LTD., Osaka (JP)

(72) Inventors: Hiroyuki Kaneshiro, Osaka (JP); Mika Araki, Osaka (JP)

(73) Assignee: NITTO KASEI CO., LTD., Osaka (JP)

( * ) Notice: Subject to any disclaimer, the term of this patent is extended or adjusted under 35 U.S.C. 154(b) by 232 days.

(21) Appl. No.: 16/303,991

(22) PCT Filed: Jun. 20, 2017

(86) PCT No.: PCT/JP2017/022675
§ 371 (c)(1),
(2) Date: Nov. 21, 2018

(87) PCT Pub. No.: WO2018/008386
PCT Pub. Date: Jan. 11, 2018

(65) Prior Publication Data
US 2020/0317697 A1    Oct. 8, 2020

(30) Foreign Application Priority Data

Jul. 5, 2016 (JP) .............................. JP2016-133293

(51) Int. Cl.
*C07F 3/02* (2006.01)
*C08G 63/83* (2006.01)
*C08G 63/00* (2006.01)

(52) U.S. Cl.
CPC .............. *C07F 3/02* (2013.01); *C08G 63/00* (2013.01); *C08G 63/83* (2013.01)

(58) Field of Classification Search
CPC ............ C07F 3/02; C08G 63/00; C08G 63/83
See application file for complete search history.

(56) References Cited

U.S. PATENT DOCUMENTS

| | | | |
|---|---|---|---|
| 4,260,735 A * | 4/1981 | Bander | C08G 63/85 528/279 |
| 6,166,170 A * | 12/2000 | Putzig | B01J 27/16 502/102 |
| 2004/0241565 A1 | 12/2004 | Kishiki et al. | |
| 2005/0215426 A1 * | 9/2005 | Putzig | B01J 31/223 502/150 |
| 2009/0076242 A1 | 3/2009 | Higashijima et al. | |
| 2009/0221420 A1 | 9/2009 | Higashijima et al. | |
| 2011/0301019 A1 | 12/2011 | Higashijima et al. | |
| 2011/0301020 A1 | 12/2011 | Higashijima et al. | |
| 2011/0301322 A1 | 12/2011 | Higashijima et al. | |
| 2011/0313127 A1 | 12/2011 | Iwasa et al. | |
| 2016/0096919 A1 | 4/2016 | Bouyahyi et al. | |
| 2016/0108181 A1 | 4/2016 | Williams et al. | |
| 2018/0305501 A1 | 10/2018 | Williams et al. | |

FOREIGN PATENT DOCUMENTS

| | | |
|---|---|---|
| CN | 104629663 A | 5/2015 |
| EP | 2 210 910 A1 | 7/2010 |
| JP | 04-202506 A | 7/1992 |
| JP | 3647689 B2 | 5/2005 |
| JP | 3750816 B2 | 3/2006 |
| JP | 2006-199870 A | 8/2006 |
| JP | 2010-072476 A | 4/2010 |
| JP | 2016-518502 A | 6/2016 |
| WO | 2010/087422 A1 | 8/2010 |
| WO | 2014/188340 A1 | 11/2014 |

OTHER PUBLICATIONS

Lai et al Comparison of L-lactide polymerization by using magnesium complexes bearing 2-(arylideneamino)phenolate and 2-((arylimino)methyl)phenolate ligands, European Polymer Journal vol. 135, Jul. 15, 2020, (Year: 2020).*
Ghosh et al "Magnesium complexes of the N, O polydentate scaffold: Synthesis,structural characterization and polymerization studies", Polymer 70, 2015 pp. 38-51 (Year: 2015).*
Ahmadnian et al "Screening of Different Titanium(IV) Catalysts in the Synthesis of Poly(ethylene terephthalate)" Macromol. React. Eng. 2008, 2, 513-521 (Year: 2008).*
International Search Report dated Aug. 29, 2017, issued in corresponding International Application No. PCT/JP2017/022675, filed Jun. 20, 2017, 2 pages.
First Office Action dated Sep. 11, 2020, issued in corresponding Chinese Application No. 201780040509.0, 16 pages.

* cited by examiner

Primary Examiner — Ling Siu Choi
Assistant Examiner — Gennadiy Mesh
(74) Attorney, Agent, or Firm — Christensen O'Connor Johnson Kindness PLLC

(57) ABSTRACT

A catalyst for preparing polyester resins from monobasic or polybasic acids and polyhydric alcohols, comprising a Magnesium compound which has a bonding portion represented by formula —Mg—O—$(CR^1{}_2)a$-Q, wherein Q is a Nitrogen or Sulfur and a is an integer from 1 to 4, is disclosed. Catalyst may further comprise Titanium compounds, for example titanium alkoxide, wherein titanium diisopropoxy bistriethanolaminate is particularly preferable from the viewpoint of reactivity and coloring property. Catalyst is capable of shortening production time for polyester resins.

9 Claims, No Drawings

CATALYST FOR POLYESTER POLYMERIZATION AND METHOD FOR PRODUCING POLYESTER RESIN

TECHNICAL FIELD

The present invention relates to a catalyst for polyester polymerization, the catalyst is used for producing a polyester resin for various applications such as films, sheets, fibers, electrophotographic toner materials and the like, and a process for producing the polyester resin using the catalyst.

BACKGROUND ART

Polyester resins are used for various applications such as films, sheets, fibers and the like based on their chemical and physical properties. Depending on the application of the obtained resin, various catalysts such as catalysts for promoting polycondensation reaction and co-catalysts for enhancing catalytic activity have also been studied.

For example, as a catalyst used for producing a polyester resin used for a binder resin of a toner, from the viewpoint of not only catalytic activity but also influence on toner performance such as chargeability, a tin compound such as dibutyltin oxide is widely used. In recent years, from the viewpoint of safety and the like, a titanium compound tends to be preferably used as a catalyst rather than a tin compound having Sn—C bond such as dibutyltin oxide (Patent Literature 1).

However, when a certain titanium compound is used as a catalyst, there is a problem that the reaction time becomes extremely longer and the resin becomes colored. Therefore, in order to shorten the reaction time, various additives have been studied. For example, in Patent Literature 2, magnesium acetate tetrahydrate is used. Although these magnesium compounds lead to shortening of reaction time, there is room for further improvement.

CITATION LIST

Patent Literature

Patent Literature 1: JP3750816
Patent Literature 2: JP3647689

SUMMARY OF INVENTION

Technical Problem

The present invention has been made in view of such circumstances, and provides a catalyst for polyester polymerization capable of shortening production time of a polyester resin.

Solution to Problem

An aspect of the present invention provides a catalyst for polyester polymerization comprising a magnesium compound (A), wherein the magnesium compound (A) has a bonding portion represented by formula (1).

(a is an integer from 1 to 4, and Q is a nitrogen atom or a sulfur atom.)

As a result of intensive investigation by the present inventors to shorten the production time of the polyester resin, it has been found that when the magnesium compound (A) having a bonding portion represented by the formula (1) was used as a catalyst, the polycondensation reaction of the alcohol component and the acid component, which are raw materials of the polyester resin, is greatly promoted, and the present invention has been completed.

DESCRIPTION OF EMBODIMENTS

Hereinafter, the present invention will be explained in detail.

1. Catalyst for Polyester Polymerization

A catalyst for polyester polymerization of the present invention comprises a magnesium compound (A) as an essential component. Further, the catalyst may comprise a titanium compound (B) and other catalyst components.

<Magnesium Compound (A)>

The magnesium compound (A) has a bonding portion represented by formula (1). When the magnesium compound (A) has such a bonding portion, a polycondensation reaction of an alcohol component and an acid component is promoted. In the formula (1), "a" is an integer from 1 to 4 (1, 2, 3, or 4). Q is a nitrogen atom or a sulfur atom. $(C)_a$ is one carbon atom when "a" is 1, and when "a" is 2 to 4, it means carbon atoms bonded in a straight chain.

The bonding portion represented by the formula (1) is preferably a portion represented by formula (2). In the formula (2), $R^1$ represents hydrogen or an alkyl group having 1 to 4 carbon atoms. It is preferred that one or both of the two $R^1$s of each carbon atom is hydrogen. Examples of the alkyl group having 1 to 4 carbon atoms represented by $R^1$ include a methyl group, an ethyl group, a propyl group, an isopropyl group, a butyl group, an isobutyl group, an s-butyl group and a t-butyl group. Examples of an alkylene group represented by —$(CR^1{}_2)_a$— include a methylene group, an ethylene group, a propylene group, an isopropylene group, a butylene group, an isobutylene group, an s-butylene group and a t-butylene group.

Examples of the magnesium compound (A) having the bonding portion represented by the formula (1) or (2) include a magnesium compound (A1) not having a Ti—O bond and a magnesium compound (A2) having a Ti—O bond. Hereinafter, each compound will be described in detail.

(a) Magnesium Compound (A1) not Having a Ti—O Bond

The magnesium compound (A1) not having a Ti—O bond preferably has a structure represented by formula (3). In the formula (3), $X^1$ is —$(CR^1{}_2)_a$—N(—Y)$_2$, —$(CR^1{}_2)_a$S—$Y^1$, or two $X^1$ are substituted with a portion represented by formula (4) or formula (19). $Y^1$ is $R^2$, or two $Y^1$ are substituted with a portion represented by formula (5). $R^2$ is an alkyl group having 1 to 28 carbon atoms which may have a substituent. The carbon number of $R^2$ is preferably 1 to 4. Specifically, examples of the carbon number of $R^2$ are 1, 2, 3, 4, 5, 6, 7, 8, 9, 10, 11, 12, 13, 14, 15, 16, 17, 18, 19, 21, 22, 23, 24, 25, 26, 27, 28 and may be within the range between any two of the numerical values exemplified here. Examples of the substituent which $R^2$ may have include a hydroxyl group, an alkoxy group, an amino group, an aminoalkoxy group and the like. Examples of $R^2$ include a methyl group, an ethyl group, a propyl group, a butyl group, an octyl group, a stearyl group, a hydroxyethyl group, a hydroxypropyl group, a hydroxyisopropyl group, a hydroxybutyl group and the like.

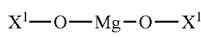
[Chem. 4]
$$X^1\text{—}O\text{—}Mg\text{—}O\text{—}X^1 \quad (3)$$

(4)

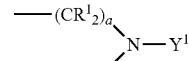
[Chem. 5]
(5)

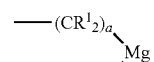
[Chem. 19]
(19)

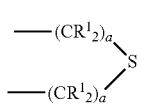

$R^2$ of the magnesium compound (A1) is preferably —$(CR^1_2)_b$—$Z^1$. "b" is 1 to 28, preferably 1 to 4. Specifically, examples of "b" are 1, 2, 3, 4, 5, 6, 7, 8, 9, 10, 11, 12, 13, 14, 15, 16, 17, 18, 19, 20, 21, 22, 23, 24, 25, 26, 27, 28 and may be within the range between any two of the numerical values exemplified here. $Z^1$ is hydrogen, a hydroxyl group, or —O—Mg—O—$X^1$.

Examples of the magnesium compound (A1) include those represented by formulas (12) to (14) and formulas (21) to (24). The magnesium compound (A1) used as a catalyst may be a single compound or a mixture of a plurality of compounds.

[Chem. 12]
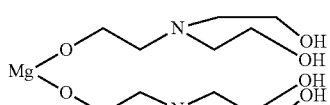
(12)

[Chem. 13]
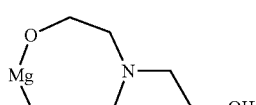
(13)

[Chem. 14]
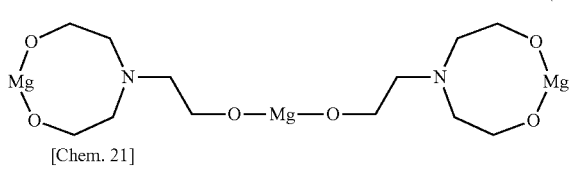
(14)

[Chem. 21]
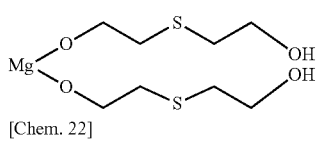
(21)

[Chem. 22]
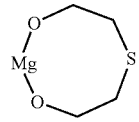
(22)

[Chem. 23]
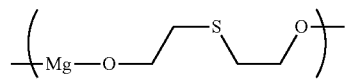
(23)

[Chem. 24]
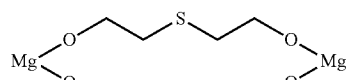
(24)

A method for producing the magnesium compound (A1) is not particularly limited, but may be, for example, a ligand exchange reaction between a magnesium alkoxide and a heteroatom-containing alcohol (an amino alcohol or a sulfur-containing alcohol), or a reaction of magnesium oxide and a heteroatom alcohol. The reaction can be accelerated by a dealcoholization or dehydration under appropriate conditions of heating temperature and reduced pressure. In the reaction, a solvent may be used, if necessary.

Examples of the magnesium alkoxide include magnesium dimethoxide, magnesium diethoxide, magnesium diisopropoxide, magnesium di-t-butoxide and the like.

Examples of the amino alcohol include: an alkanolamine compound such as a monoalkanolamine compound, a dialkanolamine compound, a trialkanolamine compound and the like; an alkylamine compound such as a trialkylamine and the like. Among those amino alcohols, alkanolamine is preferable, and trialkanolamine is more preferable.

Examples of the sulfur-containing alcohol include alkanol sulfide compounds such as a monoalkanol sulfide compound and a dialkanol sulfide compound, among which a dialkanol sulfide compound is preferable.

A solvent that can be used is not particularly limited, but for example, alcohols such as methanol, ethanol, isopropanol, butanol and the like may be used.

When a molar ratio of magnesium to amino alcohol is 1:2, the compound of the formula (12) is the main component. As the proportion of magnesium increases, the proportion of the compound of the formula (13) gradually increases, and when the molar ratio of magnesium to amino alcohol becomes 1:1, the compound of the formula (13) becomes the main component. As the proportion of magnesium increases, the proportion of the compound of the formula (14) gradually increases, and when the molar ratio of magnesium to amino alcohol becomes 3:2, the compound of the formula (14) becomes the main component.

When a molar ratio of magnesium and the sulfur-containing alcohol is 1:2, the compound of the formula (21) is the main component. As the proportion of magnesium increases, the proportion of the compounds of the formulas (22) to (24) gradually increases, and when the molar ratio of magnesium and sulfur-containing alcohol becomes 1:1, the compounds of the formulas (22) to (24) is the main component.

(b) Magnesium Compound (A2) Having a Ti—O Bond

The magnesium compound (A2) having a Ti—O bond preferably has a bonding portion represented by formula (6). The bonding portion represented by the formula (6) has a Q-$(C)_a$—O—Ti bonding portion starting from Q contained in the bonding portion of the formula (1). Since the Q-$(C)_a$—O—Ti bonding portion contributes to the stabilization of the magnesium compound (A2), the magnesium compound (A2) has the bonding portion represented by the formula (6), whereby the magnesium compound maintains high catalytic activity over a long period of time. The atomic ratio of Ti to Mg is preferably from 0.1 to 10, more preferably from 0.2 to 5, and even more preferably from 0.5 to 2.

  (6)

More preferably, the bonding portion represented by the formula (6) is represented by formula (7).

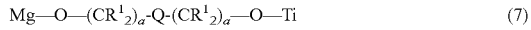  (7)

The magnesium compound (A2) preferably has a structure represented by formula (8). $X^2$ is —$(CR^1_2)_a$—N$(—Y^2)_2$, —$(CR^1_2)_a$S—$Y^1$, or two $X^2$ are substituted with a portion represented by formula (9) or formula (20). $Y^2$ is $R^2$, or two $Y^2$ are substituted with a portion represented by formula (10) or (11). $R^2$ is as described in the formula (3).

  (8)

[Chem. 9]

  (9)

[Chem. 10]

  (10)

[Chem. 11]

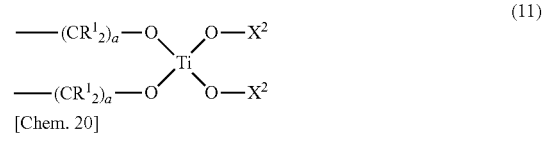  (11)

[Chem. 20]

  (20)

$R^2$ of the magnesium compound (A2) is preferably —$(CR^1_2)_b$—$Z^2$. "b" is as described in the magnesium compound (A1). $Z^2$ is hydrogen, a hydroxyl group, —O—Mg—O—$X^2$, or —O—Ti(—O—$X^2$)$_3$.

Examples of the magnesium compound (A2) include those represented by formulas (15) to (18) and formulas (25) to (28). The magnesium compound (A2) used as a catalyst may be a single compound or a mixture of a plurality of compounds.

[Chem. 15]

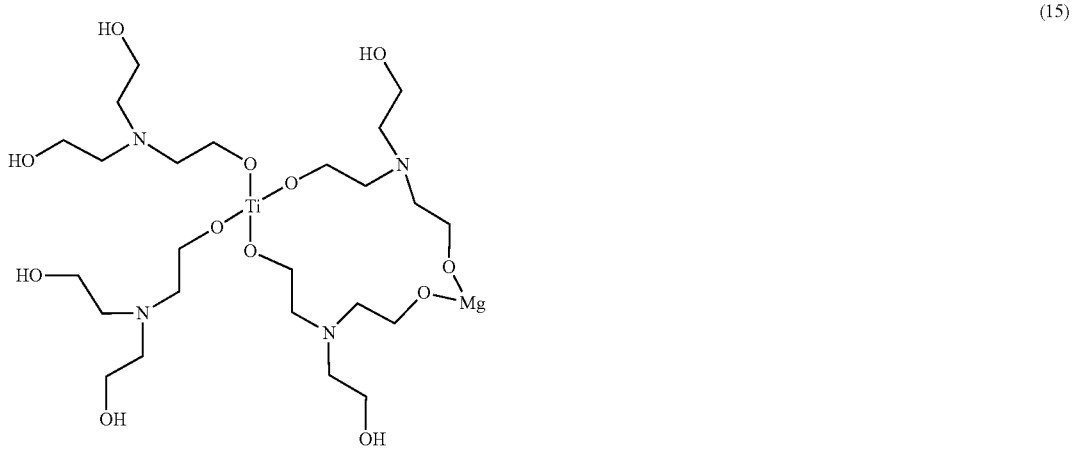  (15)

{Chem. 16}
(16)
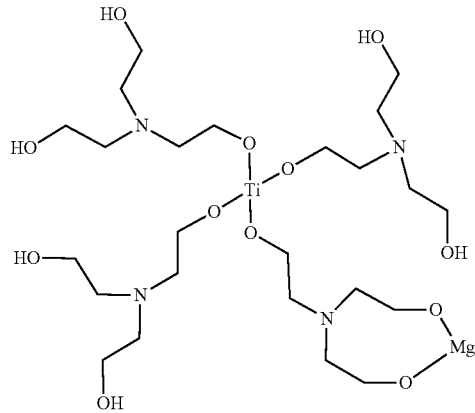
{Chem. 17}
(17)
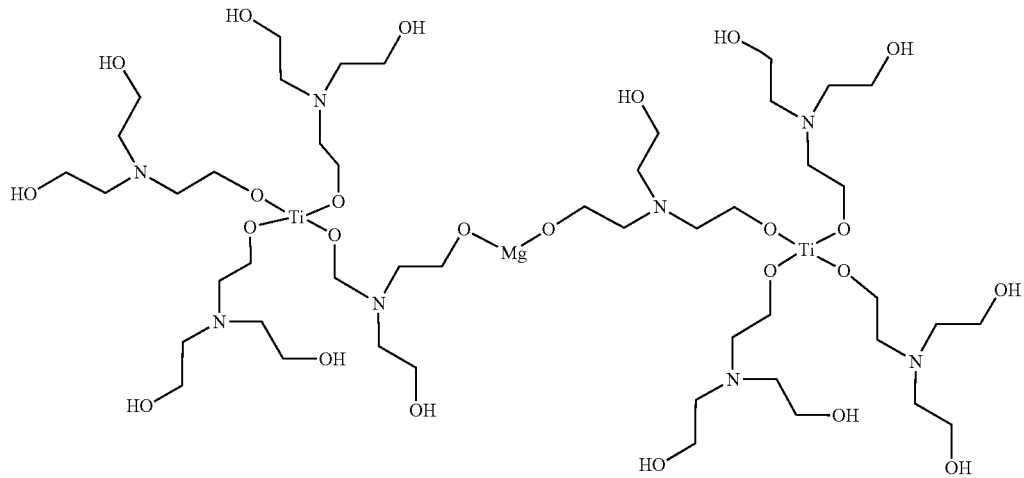
[Chem. 18]
(18)
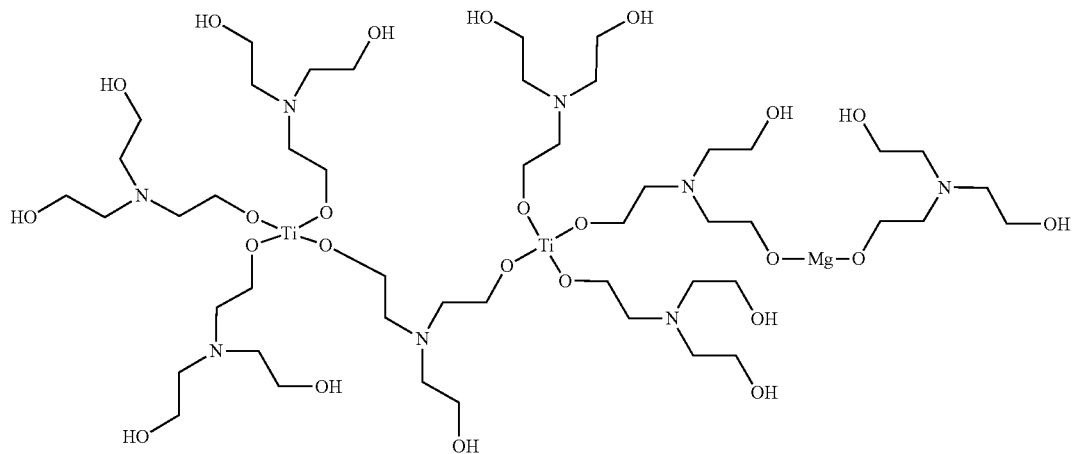

[Chem. 25]

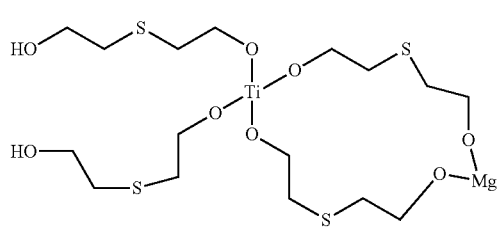

(25)

[Chem. 26]

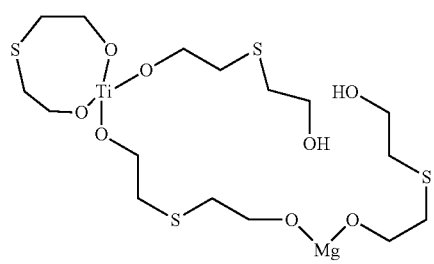

(26)

[Chem. 27]

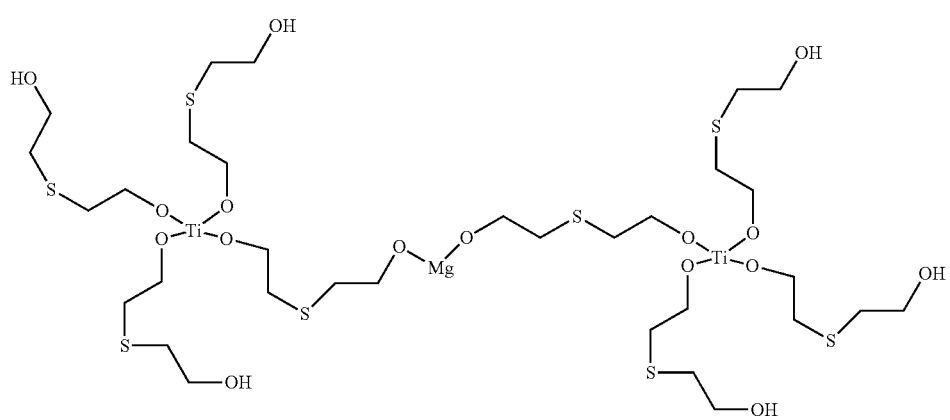

(27)

[Chem. 28]

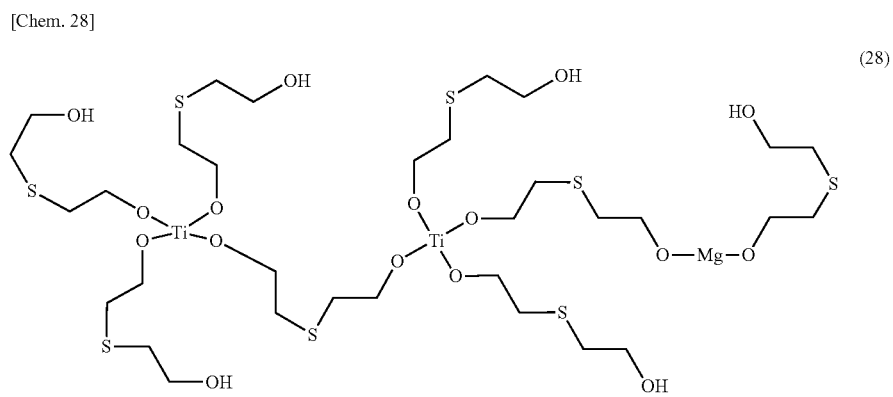

(28)

A method for producing the magnesium compound (A2) is not particularly limited, but it may be, for example: a ligand exchange reaction with a titanium alkoxide after a ligand exchange reaction between a magnesium alkoxide and a heteroatom-containing alcohol; a ligand exchange reaction with titanium alkoxide after a reaction between magnesium oxide and a heteroatom alcohol; or a ligand exchange reaction with magnesium alkoxide after a ligand exchange reaction between titanium alkoxide and heteroatom alcohol. The reactions can be accelerated by a dealcoholization or dehydration under an appropriate conditions of heating temperature and reduced pressure. In the reactions, a solvent may be used, if necessary.

Examples of the titanium alkoxide include tetraalkyl titanate such as tetra-n-propyl titanate, tetraisopropyl titanate, tetra-n-butyl titanate, tetra-t-butyl titanate, tetraphenyl titanate, tetracyclohexyl titanate, tetrabenzyl titanate and the like; titanium (oxy) acetylacetonate, titanium tetraacetylacetonate, titanium (diisopropoxide) acetylacetonate, titanium bis (ammonium lactate) dihydroxide, titanium bis (ethylacetoacetate) diisopropoxide, titanium bis (triethanolaminate) diisopropoxide and the like.

As the magnesium alkoxide, the heteroatom-containing alcohol, and the solvent, those described in the method for producing the magnesium compound (A1) can be used.

When a molar ratio of titanium, magnesium and amino alcohol is 1:1:4, the compounds of the formulas (15) to (16) are the main components. As the proportion of magnesium decreases, the proportion of the compounds of the formulas (17) to (18) gradually increases, and when the molar ratio of titanium, magnesium and amino alcohol becomes 2:1:8, the formulas (17) to (18) are the main components.

When a molar ratio of titanium, magnesium and sulfur-containing alcohol is 1:1:4, the compounds of the formulas (25) to (26) are the main components. As the ratio of magnesium decreases, the proportion of the compounds of the formulas (27) to (28) gradually increases, and when the molar ratio of titanium, magnesium and sulfur-containing alcohol is 2:1:8, the compounds of the formulas (27) to (28) is the main component.

<Titanium Compound (B)>

As the titanium compound (B), for example, the above-mentioned titanium alkoxide can be used, and titanium diisopropoxy bistriethanolaminate is particularly preferable from the viewpoint of reactivity and coloring property. By using the titanium compound (B) in combination with the magnesium compound (A), the polycondensation reaction of the alcohol component and the acid component is further accelerated. In addition, the titanium compound (B) may be used in combination with either of the magnesium compounds (A1) and (A2), but the effect by the combination with the magnesium compound (A1) is more conspicuous.

A content ratio of the magnesium compound (A) and the titanium compound (B) is preferably 0.01 to 2 in a molar ratio (magnesium atoms in the magnesium compound (A)/titanium atoms in the titanium compound (B)), more preferably 0.05 to 1.0, and further more preferably 0.1 to 1.0.

<Other Additives>

The polyester resin of the present invention may optionally contain other catalyst components such as pyrogallol, gallic acid and gallic acid ester.

(Other Catalytic Components)

Examples of other catalyst components include known catalysts such as dibutyltin oxide, antimony trioxide, iron acetate, zinc acetate, calcium acetate, aluminum acetate, lead acetate, zinc borate, lead borate, zinc chloride, aluminum chloride and the like.

2. Polymerization of Polyester Resin

The polyester resin of the present invention is obtained by polycondensing an alcohol component and an acid component in the presence of a catalyst for polyester polymerization. The timing of adding the catalyst for polyester polymerization to the reaction system may be either before or during the reaction. From the viewpoint of obtaining a higher effect on promotion of condensation polymerization reaction, the catalyst is added preferably before reaching the reaction temperature, more preferably before the start of the reaction. In the present invention, "before the start of the reaction" means a timing in which water is not generated due to the polycondensation reaction.

The polycondensation reaction is preferably carried out at 180 to 250° C. under an inert gas atmosphere. Furthermore, the condensation reaction is preferably carried out under a normal pressure or a reduced pressure, specifically, it is preferably carried out under a pressure of 4 to 102 kPa.

A content of the magnesium compound (A) in the polycondensation reaction is not particularly limited, but is usually 0.001 to 1.5 parts by mass with respect to 100 parts by mass of the total solid content of the alcohol component and the acid component, more preferably 0.01 to 1.0 part by mass, and further more preferably 0.02 to 0.5 part by mass. Within the above range, the reaction time can be greatly shortened and a polyester resin excellent in color tone can be obtained.

A content of the titanium compound (B) in the polycondensation reaction is not particularly limited, but it is usually 0.001 to 2.0 parts by mass with respect to 100 parts by mass of the total solid content of the alcohol component and the acid component, more preferably 0.05 to 1.5 parts by mass, and further more preferably 0.1 to 1.0 parts by mass.

<Alcohol Component>

Examples of the alcohol component include divalent or more polyhydric alcohols such as ethylene glycol, propylene glycol, 1,2-propanediol, 1,3-propanediol, 1,3-butanediol, 1,4-butanediol, neopentyl glycol, 1,5-pentanediol, 1,6-hexanediol, 3-methylpentanediol, diethylene glycol, 1,4-cyclohexanedimethanol, 3-methyl-1,5-pentanediol, 2-methyl-1,3-propanediol, 2,2-diethyl-1,3-propanediol, 2-butyl-2-ethyl-1,3-propanediol, hydrogenated bisphenol A, ethylene oxide adduct or propylene oxide adduct of bisphenol A, trimethylolethane, trimethylolpropane, glycerin, pentaerythritol and the like. From the viewpoint of adjusting the molecular weight and improving the offset resistance, a monovalent alcohol may be appropriately contained. These alcohols may be used alone or in combination of two or more kinds.

<Acid Component>

Examples of the acid component include monocarboxylic acids such as benzoic acid and p-t-butylbenzoic acid; aliphatic dicarboxylic acids such as oxalic acid, malonic acid, maleic acid, fumaric acid, citraconic acid, itaconic acid, glutaconic acid, succinic acid, adipic acid, sebacic acid, azelaic acid, n-dodecylsuccinic acid and n-dodecenylsuccinic acid; aromatic dicarboxylic acids such as phthalic acid, isophthalic acid, and terephthalic acid; alicyclic dicarboxylic acids such as cyclohexanedicarboxylic acid; trivalent or higher polycarboxylic acids such as trimellitic acid and pyromellitic acid; anhydrides and alkyl (1 to 3 carbon atoms) esters of these acids; rosin; rosin modified with fumaric acid, maleic acid, acrylic acid; and the like. Monocarboxylic acids and dibasic acids such as aromatic dicarboxylic acids and saturated aliphatic dicarboxylic acids may be used alone or in combination of two or more kinds. Also, the trivalent or higher polybasic acid may be used alone or in combination of two or more kinds.

EXAMPLES

Hereinafter, the present invention will be specifically described with reference to examples, but the scope of the present invention is not limited thereto. In the following description, "%" means mass %.

1. Production of Magnesium Compound (A)

1-1. Production of Magnesium Compound (A1) not Having Ti—O Bond

Production Example 1: Production of Magnesium Compound A1a 27.9 g of triethanolamine was placed in a 100 ml glass eggplant-shaped flask equipped with a stirrer. After the start of stirring, 10.70 g of magnesium diethoxide was added. The mixture was heated to 80° C. and reacted for 1 hour. Thereafter, the mixture was concentrated under a reduced pressure of 30 Torr, and the produced ethanol was distilled off. 18.44 g of magnesium compound A1a was obtained as a white solid.

Production Example 2: Production of Magnesium Compound A1b 19.7 g of N-butyl diethanolamine was placed in a 100 ml glass eggplant-shaped flask equipped with a stirring device. After the start of stirring, 7.00 g of magnesium diethoxide was added. The mixture was heated to 80° C. and reacted for 1 hour. Thereafter, the mixture was concentrated under a reduced pressure of 30 Torr, and the produced ethanol was distilled off. 18.23 g of magnesium compound A1b was obtained as a high viscosity and brown liquid.

Production Example 3 Production of Magnesium Compound A1c 39.40 g of N,N-dibutylethanolamine was placed in a 100 ml glass eggplant-shaped flask equipped with a stirring device. After the start of stirring, 3.10 g of magnesium diethoxide was added. The mixture was heated to 100° C. and reacted for 1 hour. Thereafter, the mixture was concentrated under a reduced pressure of 30 Torr. As a yellowish white liquid of a diluted solution with N, N-dibutylethanolamine, 38.48 g of magnesium compound A1c was obtained.

Production Example 4: Production of Magnesium Compound A1d 52.13 g of diethanolamine was placed in a 100 ml glass eggplant-shaped flask equipped with a stirring device. After the start of stirring, 14.76 g of magnesium diethoxide was added. The mixture was heated to 90° C. and reacted for 1 hour. Thereafter, the mixture was concentrated under a reduced pressure of 30 Torr. As a yellowish white liquid of a diluted solution with diethanolamine, 53.85 g of magnesium compound A1d was obtained.

Production Example 5: Production of Magnesium Compound A1e 0.70 g of N,N-dibutyl butanolamine was placed in a 10 ml glass eggplant-shaped flask with a stirring bar. After the start of stirring, 0.23 g of magnesium diethoxide was added. The mixture was heated to 100° C. and reacted for 1 hour. Thereafter, the mixture was concentrated under a reduced pressure of 20 Torr. 0.82 g of magnesium compound A1e was obtained as a brown liquid.

Production Example 6: Production of Magnesium Compound A1f 4.23 g of 2,2-thiodiethanol and 25.65 g of butanol were placed in a 50 ml glass eggplant-shaped flask with a stirring bar. After the start of stirring, 3.96 g of magnesium diethoxide was added. The mixture was heated to 150° C. and reacted for 1 hour while butanol and ethanol formed were distilled off. Thereafter, the mixture was concentrated under a reduced pressure of 20 Torr. 5.39 g of a magnesium compound A1f was obtained as a white solid.

1-2. Production of Magnesium Compound (A2) Having Ti—O Bond

Production Example 7: Production of Magnesium Compound A2a 53.99 g of triethanolamine was placed in a 100 ml glass eggplant-shaped flask equipped with a stirrer device. After the start of stirring, 17.15 g of titanium tetraisopropoxide was added dropwise. After it was confirmed that the exothermic reaction had ceased, it was heated to 100° C., and the produced isopropanol was distilled off. Thereafter, the mixture was concentrated under a reduced pressure of 30 Torr. An orange transparent viscous liquid was obtained. Subsequently, 6.90 g of magnesium diethoxide was added and heated to 85° C. The produced ethanol was distilled off. Thereafter, the mixture was concentrated under a reduced pressure of 20 Torr. 54.49 g of a deep orange viscous liquid was obtained (A2a). As a result of IR measurement of A2a, a new peak appeared around 795 $cm^{-1}$.

Production Example 8: Production of Magnesium Compound A2b 45.76 g of triethanolamine was placed in a 100 ml glass eggplant type flask equipped with a stirring device. After the start of stirring, 21.81 g of titanium tetraisopropoxide was added dropwise. After it was confirmed that the exothermic reaction had ceased, it was heated to 90° C., and the produced isopropanol was distilled off. Thereafter, the mixture was concentrated under a reduced pressure of 30 Torr. An orange transparent viscous liquid was obtained. Subsequently, 4.39 g of magnesium diethoxide was added and heated to 85° C. The produced ethanol was distilled off. Thereafter, the mixture was concentrated under a reduced pressure of 20 Torr. 44.48 g of a deep orange viscous liquid was obtained (A2b). As a result of IR measurement of A2b, a new peak appeared around 795 $cm^{-1}$.

Production Example 9: Production of Magnesium Compound A2c 54.91 g of triethanolamine was placed in a 100 ml glass eggplant-shaped flask equipped with a stirring device. After the start of stirring, 17.44 g of titanium tetraisopropoxide was added dropwise. After it was confirmed that the exothermic reaction had ceased, it was heated to 100° C., and the produced isopropanol was distilled off. Thereafter, the mixture was concentrated under a reduced pressure of 30 Torr. An orange transparent viscous liquid was obtained. Subsequently, 3.51 g of magnesium diethoxide was added and heated to 90° C. The produced ethanol was distilled off. Thereafter, the mixture was concentrated under a reduced pressure of 20 Torr. 51.45 g of a deep orange viscous liquid was obtained (A2c). As a result of IR measurement of A2c, a new peak appeared around 795 $cm^{-1}$.

Production Example 10: Production of Magnesium Compound A2d 36.82 g of triethanolamine was placed in a 100 ml glass eggplant-shaped flask equipped with a stirring device. After the start of stirring, 17.54 g of titanium tetraisopropoxide was added dropwise. After it was confirmed that the exothermic reaction had ceased, it was heated to 90° C., and the produced isopropanol was distilled off. Thereafter, the mixture was concentrated under a reduced pressure of 20 Torr.

An orange transparent viscous liquid was obtained. Subsequently, 2.35 g of magnesium diethoxide was added and heated to 90° C. The produced ethanol was distilled off. Thereafter, the mixture was concentrated under a reduced pressure of 20 Torr. 33.63 g of a deep orange viscous liquid was obtained (A2d). As a result of IR measurement of A2d, the appearance of a new peak was observed around 795 $cm^{-1}$.

Production Example 11: Production of Magnesium Compound A2e 36.82 g of triethanolamine was placed in a 100 ml glass eggplant-shaped flask equipped with a stirring device. After the start of stirring, 2.35 g of magnesium diethoxide was added. The mixture was heated to 90° C., and the produced ethanol was distilled off. Thereafter, the mixture was concentrated under a reduced pressure of 20 Torr. An orange suspension was obtained. Subsequently, 21.01 g of titanium tetrabutoxide was added dropwise. After it was confirmed that the exothermic reaction had ceased, it was heated to 115° C. and reacted for 1 hour. After cooling, insoluble matter was removed by filtration to obtain 52.77 g of an orange transparent liquid as a 78% butanol solution (A2e). As a result of IR measurement of A2e, the appearance of a new peak was observed around 797 $cm^{-1}$.

Production Example 12: Production of Magnesium Compound A2f 35.38 g of diethanolamine was placed in a 100 ml glass eggplant-shaped flask equipped with a stirring device After the start of stirring, 4.81 g of magnesium diethoxide was added. The mixture was heated to 90° C., and the produced ethanol was distilled off. Thereafter, the mixture was concentrated under a reduced pressure of 20 Torr. An orange transparent solution was obtained. Subsequently, 28.63 g of titanium tetrabutoxide was added dropwise. After it was confirmed that the exothermic reaction had ceased, 15.06 g of butanol was added, heated to 115° C., and then the reaction was carried out for 1 hour. As a 50% butanol solution, 78.26 g of a white emulsion was obtained (A2f). As a result of IR measurement of A2f, the appearance of a new peak was observed around 781 $cm^{-1}$.

2. Production of Polyester Resin (Examples 1 to 14 and Comparative Examples 1 to 6)

124.27 g (0.36 mol) of polyoxypropylene (2.1)-2,2-bis(4-hydroxyphenyl)propane (BPA-PO), 49.88 g of terephthalic acid (80 mol), the catalyst shown in Table 1 were placed in a 300 ml four-necked flask equipped with a nitrogen introduction tube, a dehydration tube, a stirrer and a thermocouple and reacted at 230 to 235° C. under a nitrogen atmosphere until a conversion ratio reached 93%. Thereafter, the reaction continued until the softening point at 8 KPa reached 100° C. to obtain the polyester. The reaction time when the conversion ratio reached 93% is shown in Table 1. The numerical values of the catalyst composition in Table 1 are values in "parts by mass" when the total mass of BPA-PO and terephthalic acid is 100 parts by mass.

TABLE 1

| | | | Example | | | | | | | | | | |
|---|---|---|---|---|---|---|---|---|---|---|---|---|---|
| Table 1 | | | 1 | 2 | 3 | 4 | 5 | 6 | 7 | 8 | 9 | 10 |
| Catalyst | Magnesium Compound (A1) | A1a | 0.17 | 0.06 | 0.17 | | | | | | | |
| | | A1b | | | | 0.18 | | | | | | |
| | | A1c | | | | | 0.05 | | | | | |
| | | A1d | | | | | | 0.12 | | | | |
| | | A1e | | | | | | | 0.12 | | | |
| | | A1f | | | | | | | | 0.07 | | |
| | Compound Magnesium (A2) | A2a | | | | | | | | | 0.3 | |
| | | A2b | | | | | | | | | | 0.3 |
| | | A2c | | | | | | | | | | |
| | | A2d | | | | | | | | | | |
| | | A2e | | | | | | | | | | |
| | | A2f | | | | | | | | | | |
| | Magnesium Diethoxide | | | | | | | | | | | |
| | Magnesium Acetate Tetrahydrate | | | | | | | | | | | |
| | Titanium Diisopropoxy Bistriethanolaminate | | 0.3 | 0.3 | | 0.3 | 0.3 | 0.3 | 0.3 | 0.3 | | |
| | Tetrabutyl Titanate | | | | 0.3 | | | | | | | |
| | Titanium Diisopropoxy Bisacetylacetonate | | | | | | | | | | | |
| Reaction Time (h) | | | 12 | 14 | 18 | 12 | 18 | 14 | 18 | 18 | 11 | 11 |

| | | | Example | | | | Comparative Example | | | | | |
|---|---|---|---|---|---|---|---|---|---|---|---|---|
| Table 1 | | | 11 | 12 | 13 | 14 | 1 | 2 | 3 | 4 | 5 | 6 |
| Catalyst | Magnesium Compound (A1) | A1a | | | | | | | | | | |
| | | A1b | | | | | | | | | | |
| | | A1c | | | | | | | | | | |
| | | A1d | | | | | | | | | | |
| | | A1e | | | | | | | | | | |
| | | A1f | | | | | | | | | | |
| | Compound Magnesium (A2) | A2a | | | | | | | | | | |
| | | A2b | | | | | | | | | | |
| | | A2c | 0.3 | | | | | | | | | |
| | | A2d | | 0.3 | | | | | | | | |
| | | A2e | | | 0.3 | | | | | | | |
| | | A2f | | | | 0.3 | | | | | | |

TABLE 1-continued

| | | | | | | | | | |
|---|---|---|---|---|---|---|---|---|---|
| Magnesium Diethoxide | | | | 0.06 | | | | | |
| Magnesium Acetate Tetrahydrate | | | | | 0.09 | 0.09 | | | |
| Titanium Diisopropoxy Bistriethanolaminate | | | 0.3 | 0.3 | | | 0.3 | | |
| Tetrabutyl Titanate | | | | | 0.3 | | | | 0.3 |
| Titanium Diisopropoxy Bisacetylacetonate | | | | | | | | 0.4 | |
| Reaction Time (h) | 10 | 11 | 13 | 13 | >30 | 26 | >30 | 30 | >30 | >30 |

Details of various compounds in Table 1 are as follows. Magnesium diethoxide: available from Wako Pure Chemical Industries, Ltd. Magnesium acetate tetrahydrate: available from Kansai Catalysis Chemistry Co. Titanium diisopropoxy bistriethanolaminate: available from Aldrich Tetrabutyl titanate: available from Wako Pure Chemical Industries, Ltd. Titanium diisopropoxy bisacetylacetonate, 75% isopropyl alcohol solution: available from Tokyo Chemical Industry Co., Ltd.

From the above results, it is found that the catalytic activity is enhanced by using the magnesium compound (A) in the polycondensation reaction, and the polycondensation reaction of the alcohol component and the acid component is accelerated. Therefore, in Examples 1 to 14 in which the magnesium compound (A) is contained in the catalyst, in contrast to Comparative Examples 1 to 6 in which the magnesium compound (A) is not contained in the catalyst, the required reaction time for advancing the polymerization reaction of the alcohol component and the acid component is remarkably shortened.

The invention claimed is:

1. A process for producing a polyester resin, comprising polycondensing an alcohol component and an acid component in the presence of a catalyst for polyester polymerization, wherein
    the catalyst for polyester polymerization comprising a magnesium compound (A), and
    the magnesium compound (A) has a bonding portion represented by formula (2), $$—Mg—O—(CR^1_2)_a-Q— \quad (2)$$

wherein a is an integer from 1 to 4, and Q is a nitrogen atom or a sulfur atom, and $R^1$ represents hydrogen or an alkyl group having 1 to 4 carbon atoms, and wherein the alcohol component includes a divalent or more polyhydric alcohol, and the acid component includes at least one of an aliphatic dicarboxylic acid, an aromatic dicarboxylic acid, an alicyclic dicarboxylic acid, a trivalent or higher polycarboxylic acid, and anhydrides of these acids.

2. The process of claim 1, wherein in the polycondensing, an existing amount of the magnesium compound (A) is 0.01 to 2 parts by mass with respect to 100 parts by mass of the raw material monomer of the polyester resin.

3. The process of claim 1, wherein the magnesium compound (A) has a structure represented by formula (3), $$X^1—O—Mg—O—X^1 \quad (3)$$

wherein:
    $X^1$ is $—(CR^1_2)_a—N(—Y^1)_2$, or $—(CR^1_2)_a—S—Y^1$, or two $X^1$ are substituted with a portion represented by formula (4) or formula (19); and
    $Y^1$ is $R^2$, or two $Y^1$ are substituted with a portion represented by formula (5), wherein $R^2$ is an alkyl group having 1 to 28 carbon atoms which may have a substituent, wherein:

[Chem. 4]

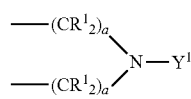

$$(4)$$

[Chem. 5]

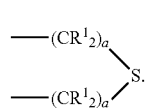

$$(5)$$

[Chem. 19]

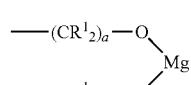

$$(19)$$

4. The process of claim 3, wherein $R^2$ is $—(CR^1_2)_b—Z^1$, wherein b is 1 to 28, and $Z^1$ is hydrogen, a hydroxyl group, or $—O—Mg—O—X^1$.

5. The process of claim 1, further comprising a titanium compound (B).

6. The process of claim 5, wherein a content ratio of the magnesium compound (A) and the titanium compound (B) is 0.01 to 2.0 in a molar ratio defined by magnesium atoms in the magnesium compound (A)/titanium atoms in the titanium compound (B).

7. The process of claim 1, wherein the magnesium compound (A) has a bonding portion represented by the formula (7), $$Mg—O—(CR^1_2)_a-Q-(CR^1_2)_a—O— \quad (7)$$

wherein $R^1$ represents hydrogen or an alkyl group having 1 to 4 carbon atoms.

8. The process of claim 7, wherein the magnesium compound (A) has a structure represented by formula (8), $$X^2—O—Mg—O—X^2 \quad (8)$$

wherein:
    $X^2$ is $—(CR^1_2)_a—N(—Y^2)_2$, $—(CR^1_2)_a—S—Y^1$, or two $X^2$ are substituted with a portion represented by formula (9) or formula (20); and
    $Y^2$ is $R^2$, or two $Y^2$ are substituted with a portion represented by formula (10) or (11), wherein $R^2$ is an alkyl group having 1 to 28 carbon atoms and optionally having a substituent, wherein:

[Chem. 9]

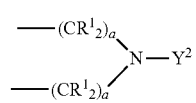

$$(9)$$

-continued
[Chem. 10]
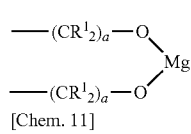
(10)
[Chem. 11]
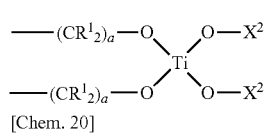
(11)
[Chem. 20]
$$\begin{matrix} -\!\!-\!(CR^1{}_2)_a \\ -\!\!-\!(CR^1{}_2)_a \end{matrix}\!\!>\!\!S. \qquad (20)$$
9. The process of claim 8, wherein $R^2$ is $-(CR^1{}_2)_b-Z^2$, wherein b is 1 to 28, and $Z^2$ is hydrogen, a hydroxyl group, $-O-Mg-O-X^2$, or $-O-Ti(-O-X^2)_3$.
* * * * *

UNITED STATES PATENT AND TRADEMARK OFFICE
CERTIFICATE OF CORRECTION

PATENT NO. : 11,059,837 B2
APPLICATION NO. : 16/303991
DATED : July 13, 2021
INVENTOR(S) : H. Kaneshiro et al.

Page 1 of 1

It is certified that error appears in the above-identified patent and that said Letters Patent is hereby corrected as shown below:

In the Claims

| Column | Line | |
|---|---|---|
| 18 | 44 | change "-O-" to -- -O-Ti -- |

Signed and Sealed this
Seventh Day of June, 2022

Katherine Kelly Vidal
*Director of the United States Patent and Trademark Office*